US012561571B2

(12) United States Patent
Yoo et al.

(10) Patent No.: US 12,561,571 B2
(45) Date of Patent: Feb. 24, 2026

(54) CHANNEL FEATURE EXTRACTION VIA MODEL-BASED NEURAL NETWORKS

(71) Applicant: QUALCOMM Incorporated, San Diego, CA (US)

(72) Inventors: Taesang Yoo, San Diego, CA (US); Kirty Prabhakar Vedula, Santa Clara, CA (US); Pavan Kumar Vitthaladevuni, San Diego, CA (US); June Namgoong, San Diego, CA (US); Srinivas Yerramalli, Hyderabad (IN); Hamed Pezeshki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 450 days.

(21) Appl. No.: 17/352,922

(22) Filed: Jun. 21, 2021

(65) Prior Publication Data

US 2022/0405602 A1     Dec. 22, 2022

(51) Int. Cl.
| | |
|---|---|
| *G06N 3/088* | (2023.01) |
| *G06N 3/045* | (2023.01) |
| *H04B 7/0413* | (2017.01) |
| *H04B 7/06* | (2006.01) |
| *H04B 17/391* | (2015.01) |
| *H04W 16/28* | (2009.01) |

(52) U.S. Cl.
CPC ............. *G06N 3/088* (2013.01); *G06N 3/045* (2023.01); *H04B 7/0413* (2013.01); *H04B 7/0626* (2013.01); *H04B 17/391* (2015.01); *H04W 16/28* (2013.01)

(58) Field of Classification Search
None
See application file for complete search history.

(56) References Cited

U.S. PATENT DOCUMENTS

| | | | |
|---|---|---|---|
| 10,785,681 B1 | 9/2020 | Ge et al. | |
| 10,911,168 B2 | 2/2021 | Studer et al. | |
| 11,424,812 B1 * | 8/2022 | Zhu ...................... | H04W 72/542 |
| 11,516,051 B2 * | 11/2022 | Chandrasekhar ........ | G06N 3/09 |
| 2012/0002742 A1 * | 1/2012 | Cheng .................. | H04B 7/0413 |
| | | | 375/267 |

(Continued)

FOREIGN PATENT DOCUMENTS

| | | | | |
|---|---|---|---|---|
| CN | 111291511 A | * | 6/2020 | ............. G06F 17/16 |
| CN | 112769461 A | * | 5/2021 | ........... H04B 17/391 |

(Continued)

OTHER PUBLICATIONS

Guo J., et al., "Convolutional Neural Network based Multiple-Rate Compressive Sensing for Massive MIMO CSI Feedback: Design, Simulation, and Analysis", arXiv:1906.06007v1 [eess.SP], Jun. 14, 2019, pp. 1-28.

(Continued)

*Primary Examiner* — Andrew C Oh
(74) *Attorney, Agent, or Firm* — Seyfarth Shaw LLP

(57) ABSTRACT

A method for wireless communication by a receiving device, includes receiving, from a transmitting device, a latent representation of a channel sequence for a wireless signal. A decoder applies a physical propagation channel model to the latent representation to reconstruct the channel sequence for the wireless signal.

38 Claims, 10 Drawing Sheets

(56) References Cited

U.S. PATENT DOCUMENTS

| | | | | |
|---|---|---|---|---|
| 2013/0201912 A1* | 8/2013 | Sheng | ................. | H04B 7/0626 |
| | | | | 370/328 |
| 2013/0286866 A1* | 10/2013 | Hammarwall | ......... | H04B 7/024 |
| | | | | 370/252 |
| 2014/0078934 A1* | 3/2014 | Hugl | .................... | H04B 17/364 |
| | | | | 370/254 |
| 2014/0200012 A1* | 7/2014 | Ito | ......................... | H04W 24/02 |
| | | | | 455/450 |
| 2015/0036652 A1* | 2/2015 | Lee | ...................... | H04L 5/0048 |
| | | | | 370/330 |
| 2016/0037301 A1* | 2/2016 | Davydov | ................ | H04W 4/90 |
| | | | | 455/456.1 |
| 2018/0013592 A1* | 1/2018 | Liu | ..................... | H04L 25/0204 |
| 2018/0367192 A1* | 12/2018 | O'Shea | ................ | H04B 7/0452 |
| 2018/0373975 A1* | 12/2018 | Yu | .......................... | G06N 3/0495 |
| 2020/0029357 A1* | 1/2020 | Shepard | ............... | H04B 7/0417 |
| 2020/0252148 A1* | 8/2020 | Bielsa López | ....... | H04B 17/391 |
| 2020/0279140 A1* | 9/2020 | Pai | ...................... | G06F 11/3447 |
| 2020/0343908 A1 | 10/2020 | Song et al. | | |
| 2020/0382929 A1 | 12/2020 | Shi et al. | | |
| 2021/0219099 A1* | 7/2021 | Koteshwar Srinath | ...................... | |
| | | | | G06N 3/0499 |
| 2021/0273707 A1* | 9/2021 | Yoo | ........................ | H04L 1/0045 |
| 2021/0302528 A1* | 9/2021 | Wang | ........................ | G01S 3/46 |
| 2021/0377825 A1* | 12/2021 | Deenoo | .............. | H04W 36/328 |
| 2022/0405602 A1* | 12/2022 | Yoo | ...................... | G06N 3/0895 |
| 2023/0062443 A1* | 3/2023 | Chakraborty | ......... | H04W 24/04 |
| 2023/0162006 A1* | 5/2023 | Larsson | ............... | G06N 3/0455 |
| | | | | 706/15 |

FOREIGN PATENT DOCUMENTS

| | | | | | | |
|---|---|---|---|---|---|---|
| CN | 114696965 | A | * | 7/2022 | .......... | H04W 72/542 |
| EP | 3962006 | A1 | * | 3/2022 | ........... | H04B 7/0617 |
| EP | 3829064 | B1 | * | 9/2022 | ............ | G06N 3/045 |
| JP | 6975245 | B2 | * | 12/2021 | .......... | B60R 25/245 |
| JP | 2022123789 | A | * | 8/2022 | ........... | H04W 16/28 |
| KR | 102228091 | B1 | * | 3/2021 | .......... | H04B 7/0413 |
| WO | WO-0052872 | A1 | * | 9/2000 | .......... | H04B 7/0851 |
| WO | WO-2018032016 | A1 | * | 2/2018 | .............. | H04B 1/10 |
| WO | WO-2018128895 | A1 | * | 7/2018 | .......... | H04B 7/0417 |
| WO | WO-2021003210 | A1 | * | 1/2021 | .............. | G06N 3/04 |
| WO | WO-2021175444 | A1 | * | 9/2021 | ........ | H04L 25/0254 |
| WO | WO-2021216429 | A1 | * | 10/2021 | ............ | G06N 3/045 |
| WO | WO-2021252727 | A1 | * | 12/2021 | .......... | H04B 7/0617 |
| WO | WO-2022135707 | A1 | * | 6/2022 | .......... | G01S 5/0278 |

OTHER PUBLICATIONS

Gunduz D., et al., "Machine Learning in the Air", IEEE Journal on Selected Areas in Communications, IEEE Service Center, Piscataway, US, vol. 37, No. 10, Oct. 1, 2019, pp. 2184-2199.

International Search Report and Written Opinion—PCT/US2022/033405—ISA/EPO—Oct. 17, 2022.

Liu Z., et al., "Overcoming the Channel Estimation Barrier in Massive MIMO Communication via Deep Learning", IEEE Wireless Communications, Coordinated Science Laboratory, Dept, Electrical and Computer Engineering, University of Illinois at Urbana-Champaign, US, vol. 27, No. 5, Oct. 2020, pp. 104-111.

Mashhadi M.B, et al., "Deep Learning for Massive MIMO Channel State Acquisition and Feedback", arxiv.org, Cornell University Library, 201 Olin Library Cornell University Ithaca, NY14853, Feb. 17, 2020 (Feb. 17, 2020), 14 Pages.

Zou C., et al., "Channel Autoencoder for Wireless Communication: State of the Art, Challenges, and Trends", IEEE Communications Magazine, IEEE Service Center, Piscataway, US, vol. 59, No. 5, Jun. 3, 2021, pp. 136-142.

Liu Z., et al., "Overcoming the Channel Estimation Barrier in Massive MIMO Communication via Deep Learning", IEEE Wireless Communications, Coordinated Science Laboratory, Dept, Electrical and Computer Engineering, University of Illinois at Urbana-Champaign, US, vol. 27, No. 5, Oct. 1, 2020, pp. 104-111, XP011817282, pp. 107-109.

Taiwan Search Report—TW111122195—TIPO—Jul. 21, 2021.

* cited by examiner

402

FULLY CONNECTED

404

LOCALLY CONNECTED

410

412

414

416

406

CONVOLUTIONAL

408

550

INPUT DATA — 552

554A

CONV — 556

LNorm — 558

MAX POOL — 560

554B

CONV — 556

LNorm — 558

MAX POOL — 560

FC1 — 562

FC2 — 562

LR — 564

CLASSIFICATION SCORE — 566

800

802 — RECEIVE, FROM A TRANSMITTING DEVICE, A LATENT REPRESENTATION OF A CHANNEL SEQUENCE FOR A WIRELESS SIGNAL

804 — APPLY, VIA A DECODER, A PHYSICAL PROPAGATION CHANNEL MODEL TO THE LATENT REPRESENTATION TO RECONSTRUCT THE CHANNEL SEQUENCE FOR THE WIRELESS SIGNAL

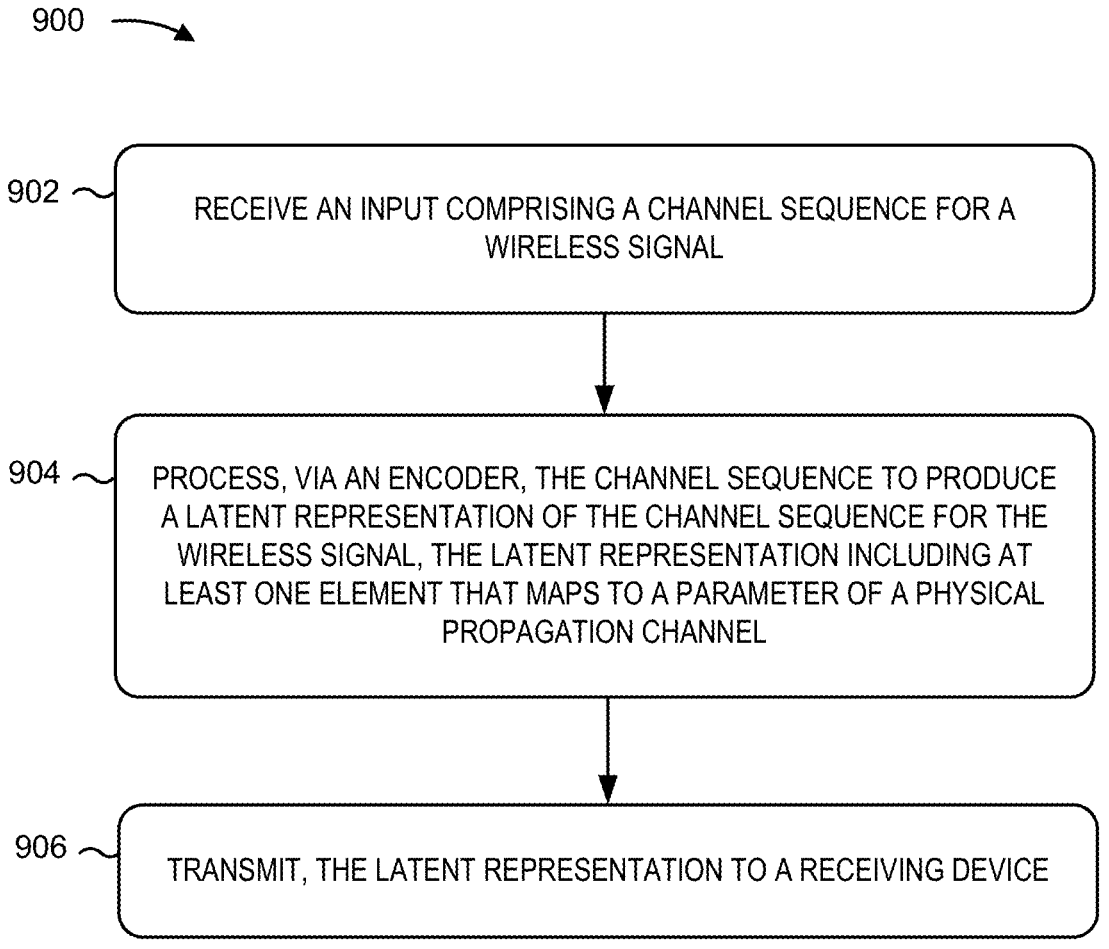

900

902 — RECEIVE AN INPUT COMPRISING A CHANNEL SEQUENCE FOR A
WIRELESS SIGNAL

904 — PROCESS, VIA AN ENCODER, THE CHANNEL SEQUENCE TO PRODUCE
A LATENT REPRESENTATION OF THE CHANNEL SEQUENCE FOR THE
WIRELESS SIGNAL, THE LATENT REPRESENTATION INCLUDING AT
LEAST ONE ELEMENT THAT MAPS TO A PARAMETER OF A PHYSICAL
PROPAGATION CHANNEL

906 — TRANSMIT, THE LATENT REPRESENTATION TO A RECEIVING DEVICE

*FIG. 9*

CHANNEL FEATURE EXTRACTION VIA MODEL-BASED NEURAL NETWORKS

FIELD OF THE DISCLOSURE

Aspects of the present disclosure generally relate to wireless communications, and more particularly to techniques and apparatuses for channel feature extraction via a physical propagation channel model-based neural network.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

The present disclosure is set forth in the independent claims, respectively. Some aspects of the disclosure are described in the dependent claims.

In an aspect of the present disclosure, a method for wireless communication by a receiving device is provided. The method includes receiving, from a transmitting device, a latent representation of a channel sequence for a wireless signal. The method also includes applying, via a decoder, a physical propagation channel model to the latent representation to reconstruct the channel sequence for the wireless signal.

In an aspect of the present disclosure, an apparatus for wireless communication by a receiving device is provided. The apparatus includes a memory and one or more processors coupled to the memory. The processor(s) are configured to receive, from a transmitting device, a latent representation of a channel sequence for a wireless signal. The processor(s) are also configured to apply, via a decoder, a physical propagation channel model to the latent representation to reconstruct the channel sequence for the wireless signal.

In an aspect of the present disclosure, an apparatus for wireless communication by a receiving device is provided. The apparatus includes means for receiving, from a transmitting device, a latent representation of a channel sequence for a wireless signal. The apparatus also includes means for applying, via a decoder, a physical propagation channel model to the latent representation to reconstruct the channel sequence for the wireless signal.

In an aspect of the present disclosure, a non-transitory computer readable medium is provided. The computer readable medium has encoded thereon program code for wireless communication by a receiving device. The program code is executed by a processor and includes code to receive, from a transmitting device, a latent representation of a channel sequence for a wireless signal. The program code also includes code to apply, via a decoder, a physical propagation channel model to the latent representation to reconstruct the channel sequence for the wireless signal.

In an aspect of the present disclosure, a method for wireless communication by a transmitting device is provided. The method includes receiving, via an encoder, an input comprising a channel sequence for a wireless signal. The method also includes processing, via the encoder, the channel sequence to produce a latent representation of the channel sequence for the wireless signal. The latent representation includes one or more elements that map to a parameter of a physical propagation channel model. Additionally, the method includes transmitting the latent representation to a receiving device.

In an aspect of the present disclosure, an apparatus for wireless communication by a transmitting device is provided. The apparatus includes a memory and one or more processors coupled to the memory. The processor(s) are configured to receive, via an encoder, an input comprising a channel sequence for a wireless signal. The processor(s) are also configured to process, via the encoder, the channel sequence to produce a latent representation of the channel sequence for the wireless signal. The latent representation includes one or more elements that map to a parameter of a physical propagation channel model. In addition, the processor(s) are configured to transmit the latent representation to a receiving device.

In an aspect of the present disclosure, an apparatus for wireless communication by a transmitting device is provided. The apparatus includes means for receiving, via an encoder, an input comprising a channel sequence for a wireless signal. The apparatus also includes means for processing, via the encoder, the channel sequence to produce a latent representation of the channel sequence for the wireless signal. The latent representation includes one or more elements that map to a parameter of a physical propagation channel model. Additionally, the apparatus includes means for transmitting the latent representation to a receiving device.

In an aspect of the present disclosure, a non-transitory computer readable medium is provided. The computer readable medium has encoded thereon program code for wireless communication by a transmitting device. The program code is executed by a processor and includes code to receive, via an encoder, an input comprising a channel sequence for a wireless signal. The program code also includes code to process, via the encoder, the channel sequence to produce a latent representation of the channel sequence for the wireless signal. The latent representation includes one or more elements that map to a parameter of a physical propagation channel model. Additionally, the program code includes code to transmit the latent representation to a receiving device.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIG. 9 is a flow diagram illustrating an example process performed, for example, by a transmitting device, in accordance with various aspects of the present disclosure.

DETAILED DESCRIPTION

Figure 1:
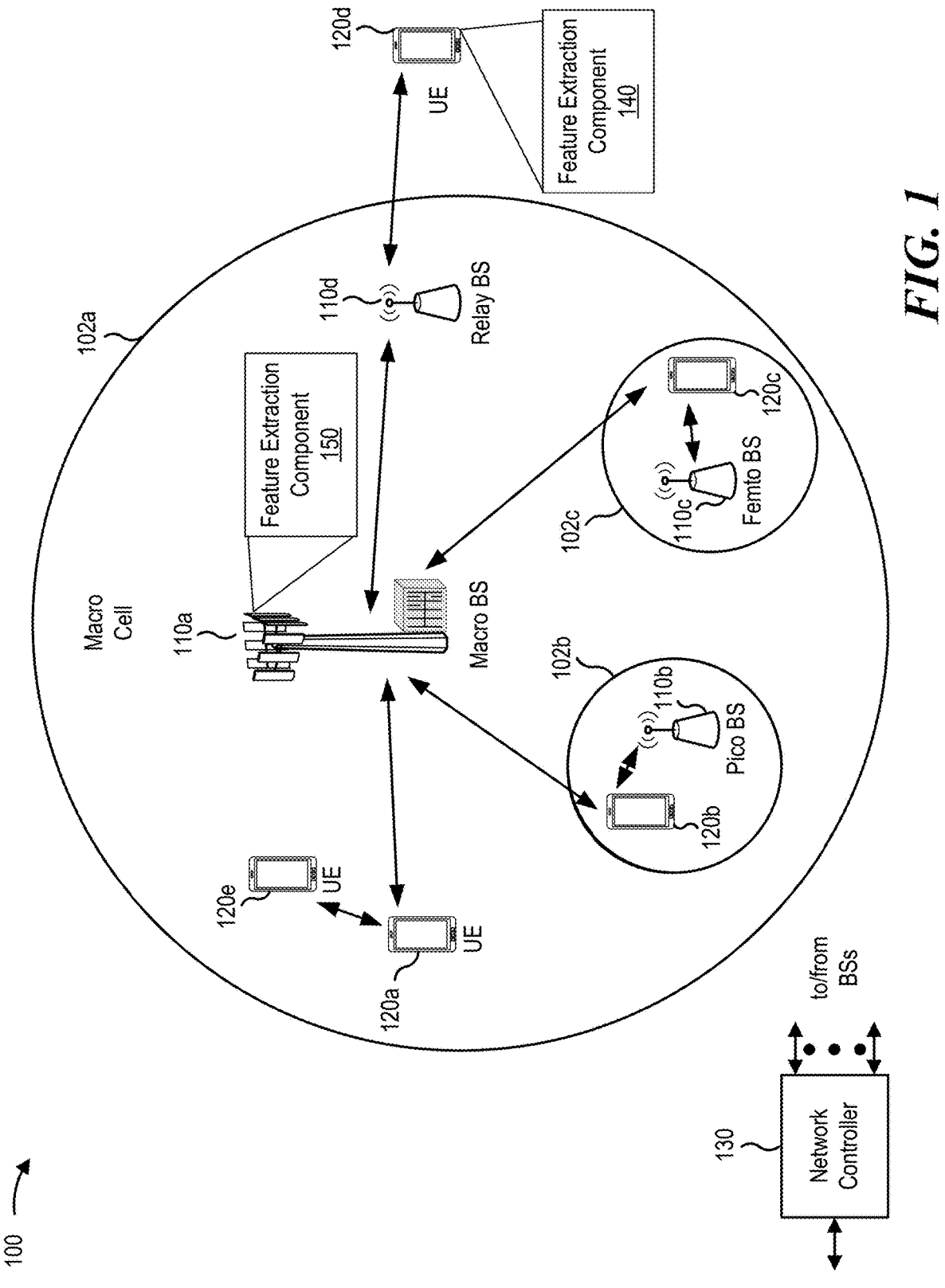
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

An observed wireless propagation channel (e.g., downlink, uplink, or sidelink) uses high dimensional data to describe the channel for example with a three-dimensional tensor over Tx antennas, Rx antennas, and subcarriers). It is desirable to extract a lower dimensional latent representation of the channel underlying the high dimensional channel. For example, extracting a compact representation may be useful for applications such as channel prediction, channel inference, channel compression, and channel generation. Channel prediction may be useful for predicting a fading channel, as well as, a reference signal received power (RSRP). In addition, a compact representation may be useful for generating inferences with respect to an unknown channel. For instance, a channel may be observed on a first set of antennas and may provide an inference of a channel on a second set of antennas, beams, frequencies, or locations. Furthermore, channel modeling may be improved for synthetic channel generation for link and system simulations, augmenting measured channels, and differentiable channel modeling.

Conventional approaches may utilize artificial neural networks to generate a compact representation. In such conventional approaches, an artificial neural network may be implemented as an autoencoder to map a channel to a latent representation and vice versa. Doing so is a non-linear process that may be expressed as:

$$h=f_\theta(z) \qquad (1)$$

$$z=f_\phi(h) \qquad (2)$$

where h is a channel (high dimensional), z is a latent representation (lower dimensional vector), and $f_\theta$ and $f_\phi$ are complicated non-linear functions (e.g., neural networks) parameterized by $\theta$ and $\phi$, respectively. While such approaches can utilize a large amount of unlabeled channel data (e.g., a channel sequence), the conventional approaches do not provide interpretability or control of the latent vector.

To address these and other deficiencies, aspects of the present disclosure are directed to a channel feature extraction via a physical propagation model-based neural network.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB)).

Referring again to FIG. 1, in certain aspects, a UE, such as the UE 120, may extract features of a channel sequence. The UE 120 may include a feature extraction component 140 configured to extract features of the channel sequence based on neural network processing. A base station, such as the base station 110, may also extract features of the channel sequence. The base station 110 may include a feature extraction component 150 configured to extract features of the channel sequence based on neural network processing.

As indicated above, FIG. 1 is provided merely as an example. Other examples may differ from what is described with regard to FIG. 1.

Figure 2:
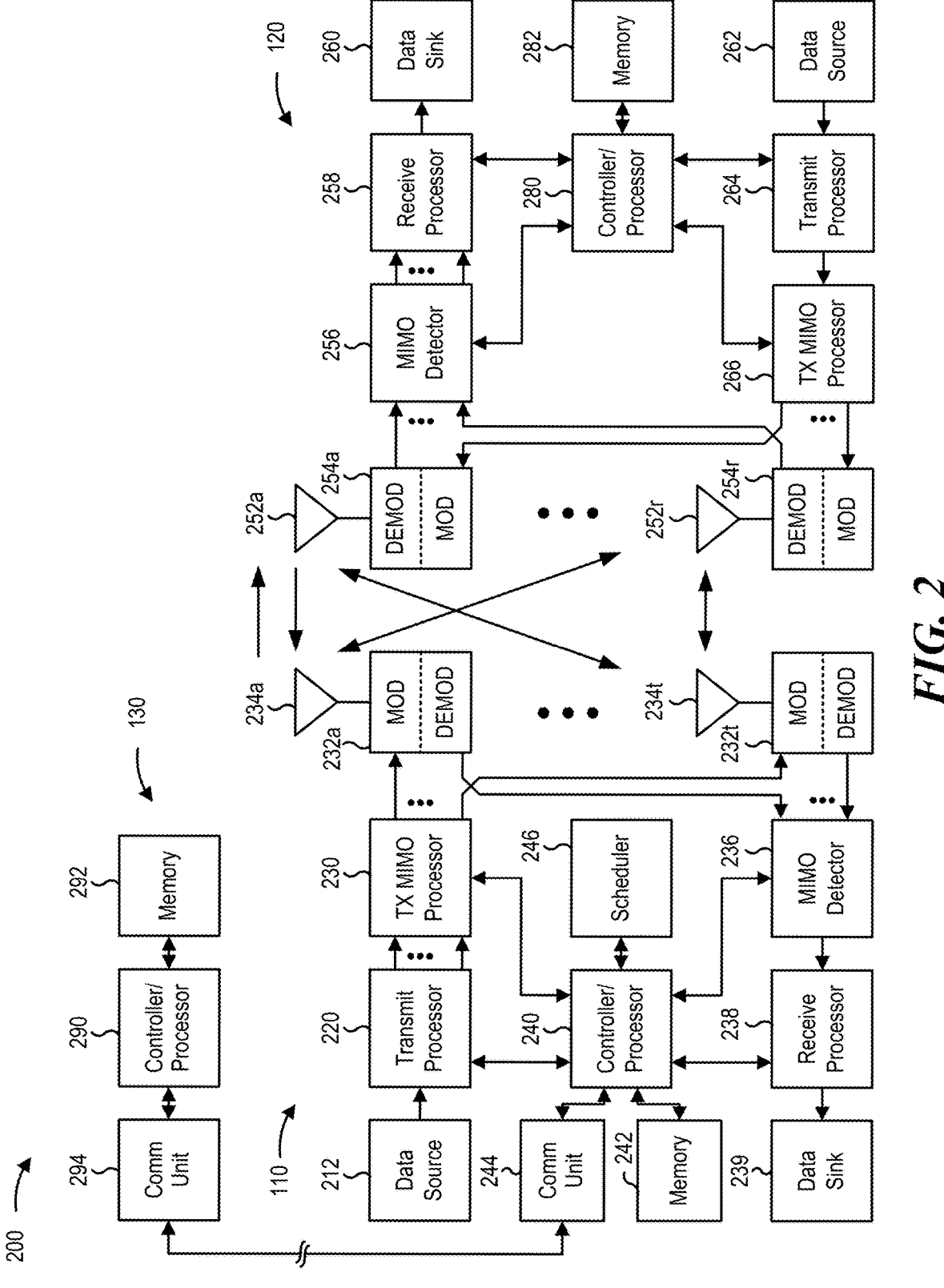
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with machine learning for optimizing an iterative process using an artificial neural network, as described in more detail elsewhere. For example, the controller/processor 240 of the base station 110, the controller/processor 280 of the UE 120, and/or any other component(s) of FIG. 2 may perform or direct operations of, for example, the processes of FIGS. 6-8 and/or other processes as described. Memories 242 and 282 may store data and program codes for the base station 110 and UE 120, respectively. A scheduler 246 may schedule UEs for data transmission on the downlink and/or uplink.

In some aspects, the UE 120, base station 110 or other networks disclosed may include means for receiving, means for capturing, means for training, and means for applying. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
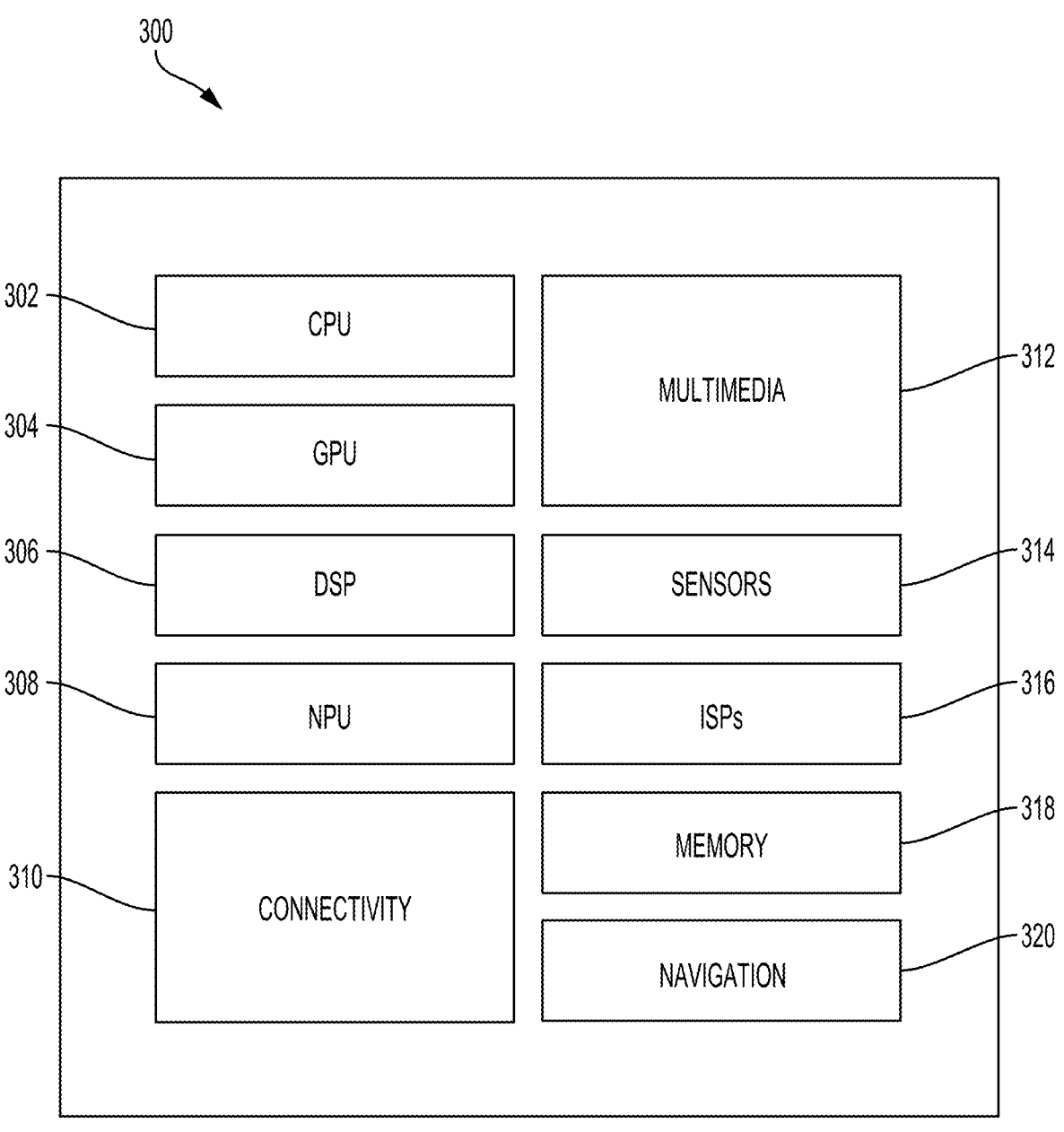
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for generating a reconstruction of a channel sequence for a wireless propagation channel, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In an aspect of the present disclosure, the instructions loaded into the general-purpose processor 302 may comprise code to receive, from a transmitting device, a latent representation of a channel sequence for a wireless signal. The instructions loaded into the general-purpose processor 302 may also comprise code to apply, via a decoder, a physical propagation channel model to the latent representation to reconstruct the channel sequence for the wireless signal.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
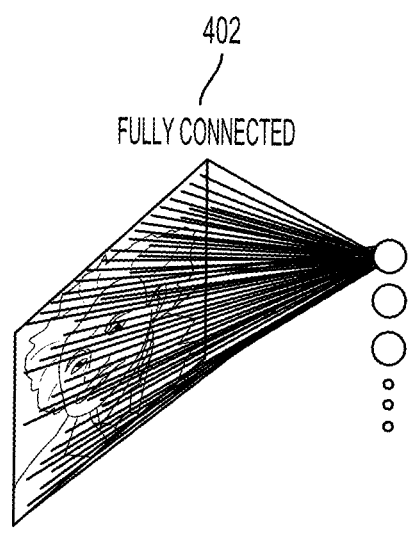
FIGS. 4A, 4B, and 4C are diagrams illustrating a neural network, in accordance with aspects of the present disclosure.
Figure 4B:
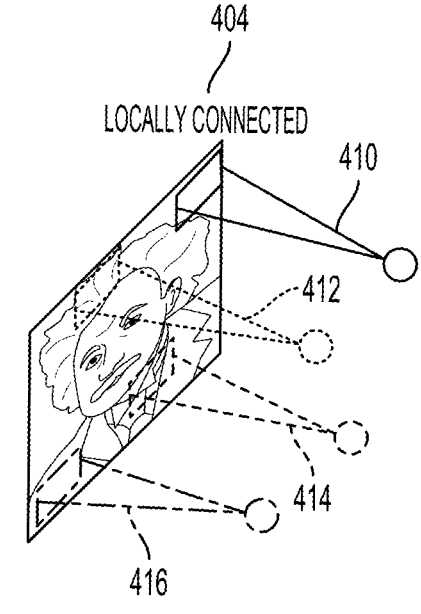

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
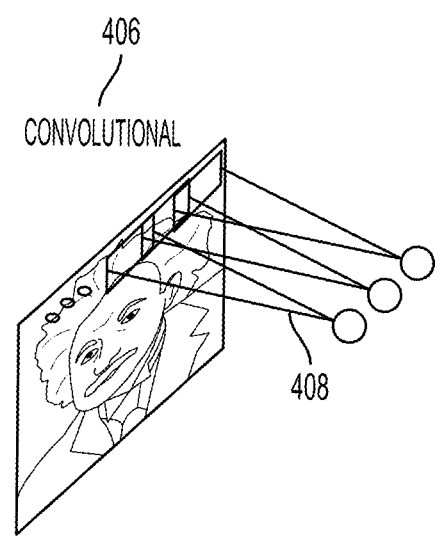

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
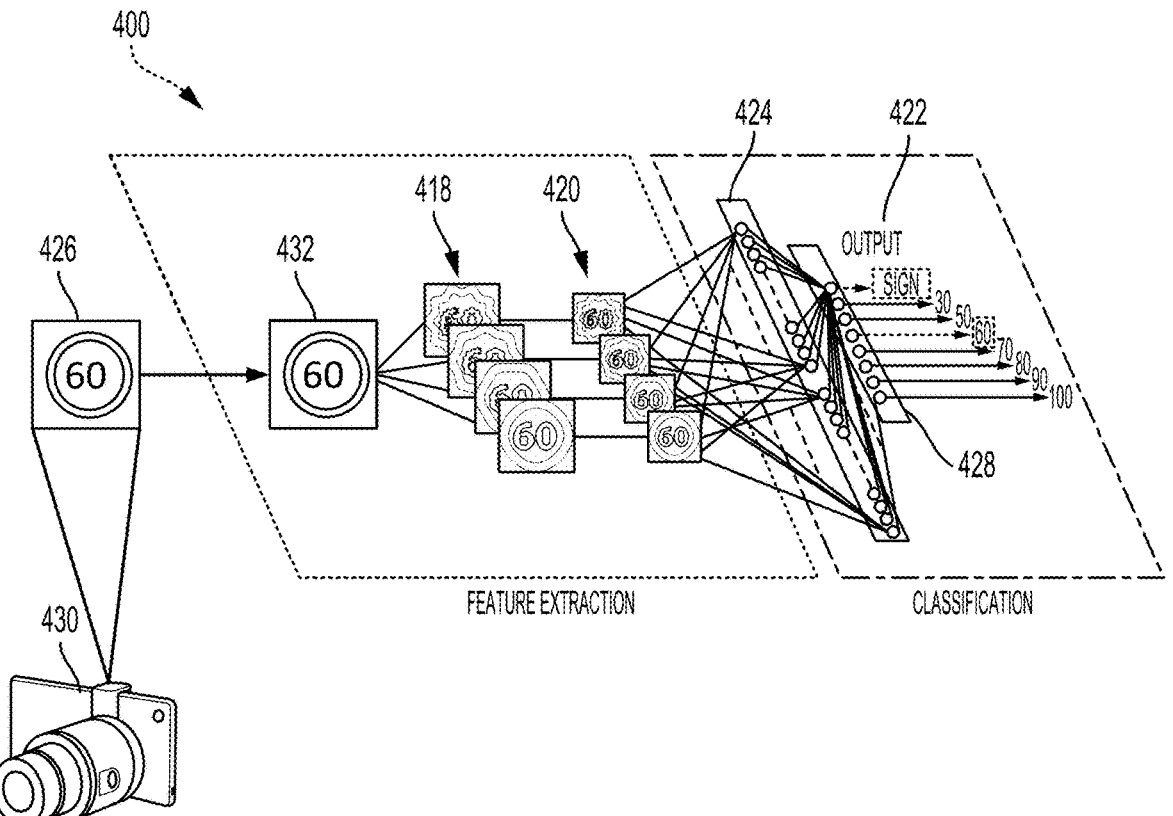
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm or process may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
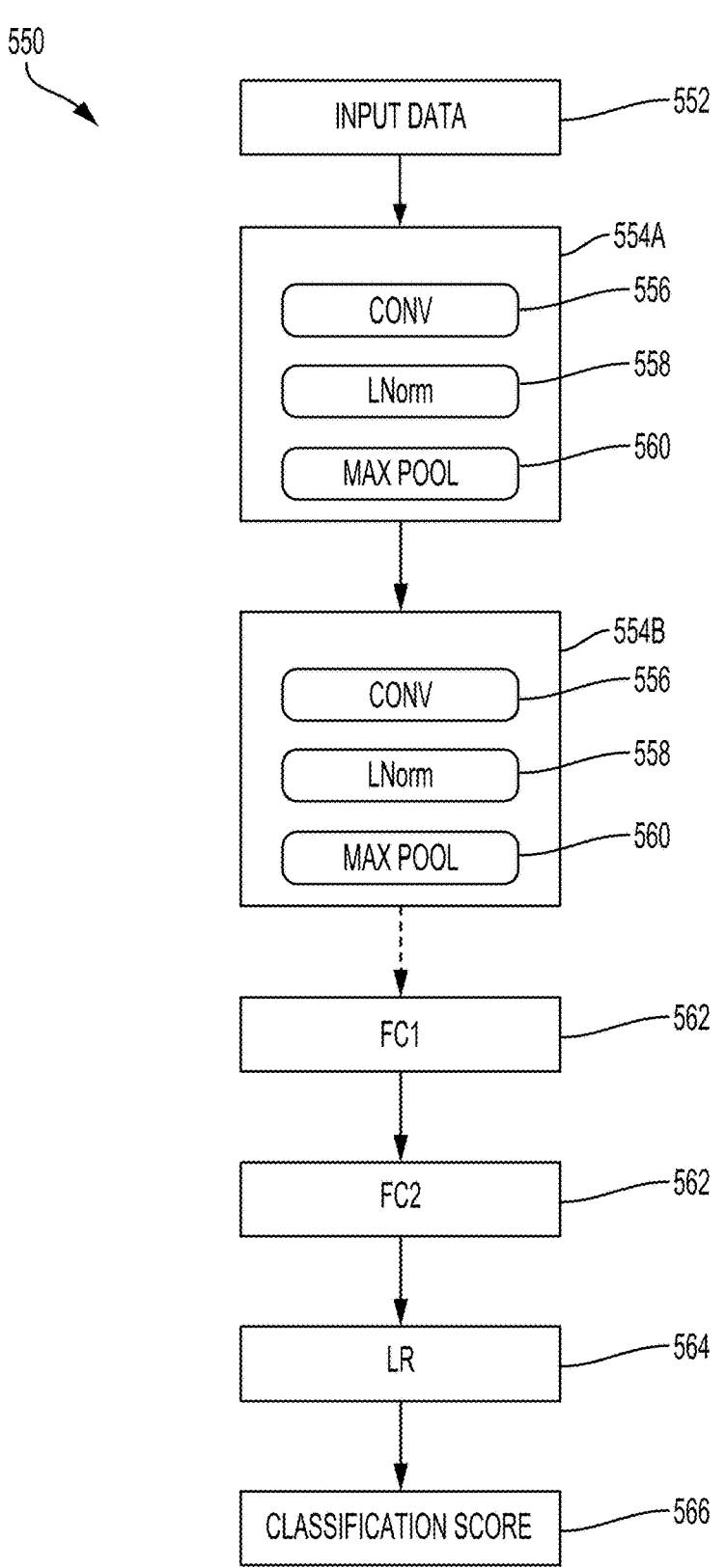
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

Figure 6:
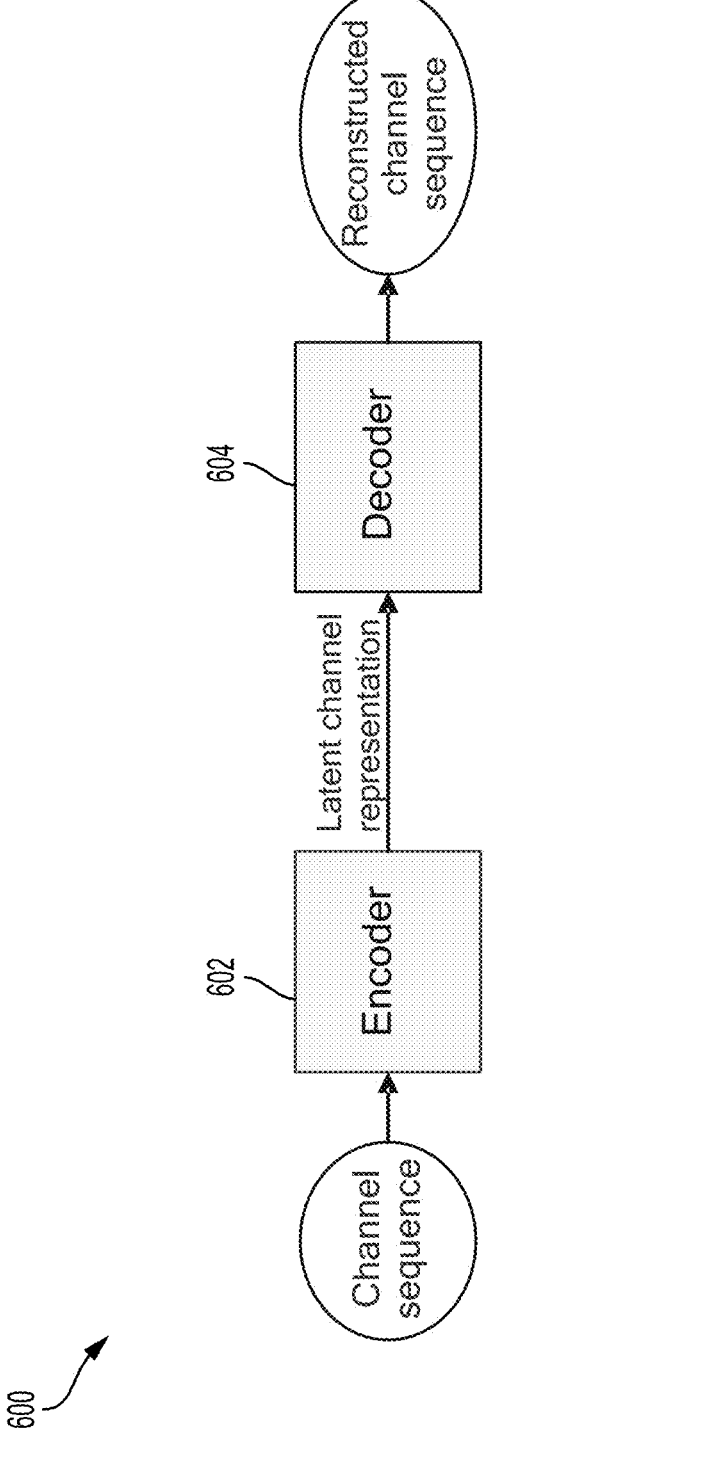
FIG. 6 is a block diagram illustrating a conventional architecture for extracting features of a channel sequence.

FIG. 6 is a block diagram illustrating a conventional architecture 600 for channel feature extraction. Referring to FIG. 6, the example architecture 600 may be an autoencoder including an encoder 602 (e.g., an inference neural network) and a decoder 604 (e.g., a generative neural network).

A channel sequence (e.g., high dimensional representation) of a wireless propagation channel may be received as an input to the encoder 602. The encoder 602 may process the channel sequence and generate a latent channel representation (e.g., low dimensional representation) of the wireless propagation channel. The latent channel representation may be supplied to the decoder 604. The decoder 604 processes the latent channel representation to produce a reconstruction of the channel sequence (high dimensional representation). This conventional architecture 600 may beneficially utilize a large amount of unlabeled channel data. However, as discussed, the conventional architecture 600 lacks interpretability and control of the latent vector.

Figure 7:
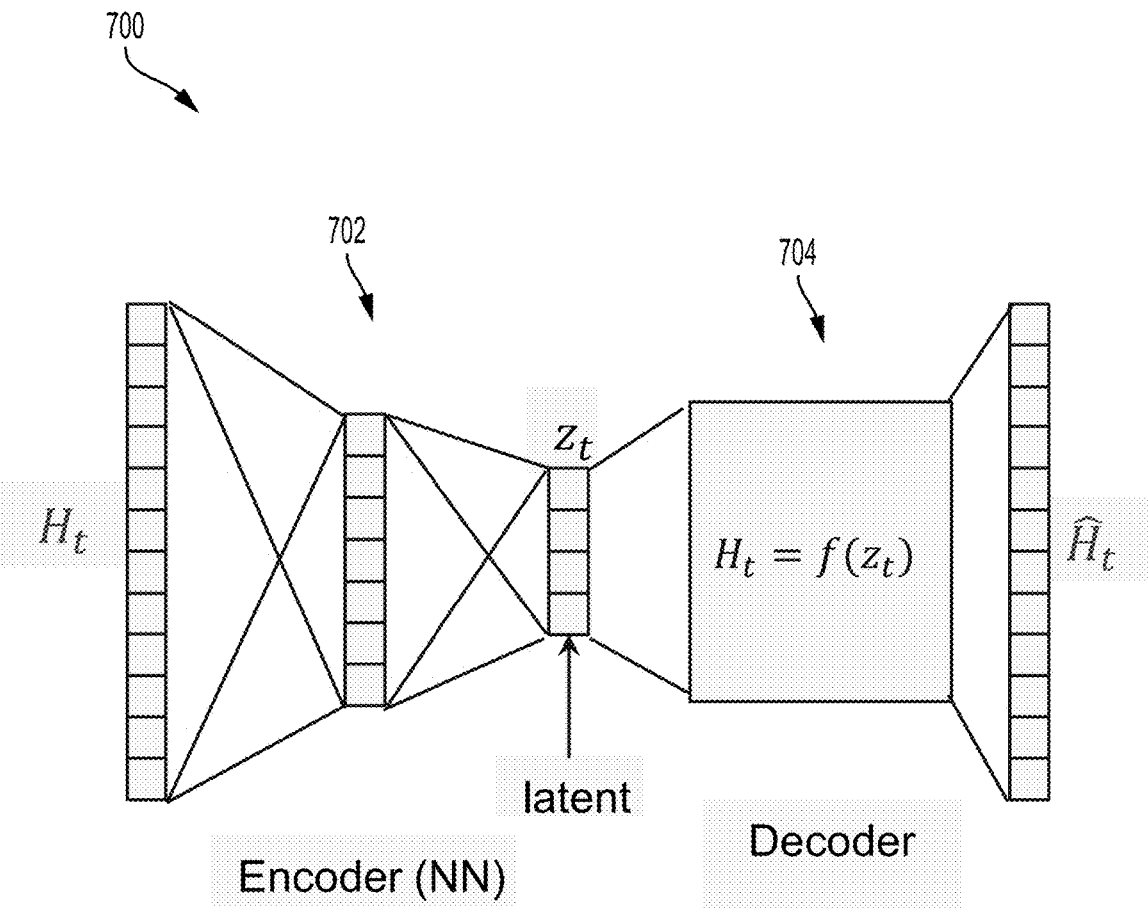
FIG. 7 is a diagram illustrating an example architecture for model-based channel feature extraction, in accordance with aspects of the present disclosure.

FIG. 7 is a diagram illustrating an example architecture 700 for model-based channel feature extraction, in accordance with aspects of the present disclosure. As shown in FIG. 7, the architecture 700 includes an encoder 702 (e.g., similar to the encoder 602) and a decoder 704. The encoder 702 may include multiple layers of convolutional filters (e.g., convolutional layer 556 shown in FIG. 5), fully connected layers, or any other types of neural network layers. The encoder 702 may receive a channel sequence (high dimensional representation) $H_t$ in a first layer as an input. The channel sequence $H_t$ may be processed via successive layers of convolutional filters of the encoder 702. Each layer of the encoder 702 may extract features of the channel sequence $H_t$ to generate a latent channel representation $z_t$.

The example architecture 700 includes the decoder 704. Rather than using a neural network as the encoder 702, a physical propagation channel model between a transmitter (e.g., a base station 110) and a receiver (e.g., UE 120) may decode the latent representation. That is, a physics-based relationship between the latent representation and the channel may be applied to generate a reconstruction of the input channel sequence. In one example, the physical propagation channel model may include a non-line of sight (NLOS) impulse response $H_{u,s,n}^{HLOS}$ such as presented in 3GPP TR 38.901 and given by:

$$H_{u,s,n}^{NLOS}(t) = \sqrt{\frac{P_n}{M}}$$

$$\sum_{m=1}^{M}\begin{bmatrix} F_{rx,u,\theta}(\theta_{n,m,ZOA}, \phi_{n,m,AOA}) \\ F_{rx,u,\theta}(\theta_{n,m,ZOA}, \phi_{n,m,AOA}) \end{bmatrix}^{T} \begin{bmatrix} \exp\left(j\Phi_{n,m}^{\theta\theta}\right) & \sqrt{K_{n,m}^{-1}}\exp\left(j\Phi_{n,m}^{\theta\theta}\right) \\ \sqrt{K_{n,m}^{-1}}\exp\left(j\Phi_{n,m}^{\theta\theta}\right) & \exp\left(j\Phi_{n,m}^{\theta\theta}\right) \end{bmatrix}$$

$$\begin{bmatrix} F_{tx,s,\theta}(\theta_{n,m,ZOD}, \phi_{n,m,AOD}) \\ F_{tx,s,\theta}(\theta_{n,m,ZOA}, \phi_{n,m,AOD}) \end{bmatrix} \exp\left(\frac{j2\pi(\hat{r}_{rx,n,m}^{T} \cdot \vec{d}_{rx,u})}{\lambda_0}\right)$$

$$\exp\left(\frac{j2\pi(\hat{r}_{rx,n,m}^{T} \cdot \vec{d}_{tx,s})}{\lambda_0}\right)\exp\left(j2\pi\frac{j2\pi(\hat{r}_{rx,n,m}^{T} \cdot \vec{v})}{\lambda_0}\right)t,$$

where $\{\Phi_{n,m}^{\theta\theta}, \Phi_{n,m}^{\theta\phi}, \Phi_{n,m}^{\phi\theta}, \Phi_{n,m}^{\phi\phi}\}$ are initial phases for each ray m of each cluster n, $F_{rx,u,\theta}$ and $F_{rx,u,\phi}$ are the field patterns of a receive antenna element u and in the direction of the spherical basis vectors, $\hat{\theta}$ and $\hat{\phi}$ respectively, $F_{tx,s,\theta}$ and $F_{tx,s,\phi}$ are the field patterns of transmit antenna element s in the direction of the spherical basis vectors, $\hat{\theta}$ and $\hat{\phi}$ respectively. The parameter $\hat{r}_{rx,n,m}$ is the spherical unit vector with azimuth arrival angle $\phi_{n,m,AOA}$ and elevation arrival angle $\theta_{n,m,ZOA}$ given by:

$$\hat{r}_{rx,n,m} = \begin{bmatrix} \sin\theta_{n,m,ZOA}\cos\phi_{n,m,AOA} \\ \sin\theta_{n,m,ZOA}\sin\phi_{n,m,AOA} \\ \cos\theta_{n,m,ZOA} \end{bmatrix},$$

where n denotes a cluster and m denotes a ray within cluster n. The parameter $\hat{r}_{tx,n,m}$ is the spherical unit vector with azimuth departure angle $\phi_{n,m,AOD}$ and elevation departure angle $\theta_{n,m,ZOD}$, given by:

$$\hat{r}_{tx,n,m} = \begin{bmatrix} \sin\theta_{n,m,ZOD}\cos\phi_{n,m,AOD} \\ \sin\theta_{n,m,ZOD}\sin\phi_{n,m,AOD} \\ \cos\theta_{n,m,ZOD} \end{bmatrix},$$

where $\vec{d}_{rx,u}$ is the location vector of receive antenna element u and $\vec{d}_{tx,s}$ is the location vector of d transmit antenna element s. The parameter $k_{n,m}$ is the cross polarisation power ratio in linear scale, and $\lambda_0$ is the wavelength of the carrier frequency.

By using a physical propagation channel model-based decoder (e.g., 704) to decode the latent representation to generate the reconstruction of the input, the latent representation may be forced to follow physical parameters such as delay and angle of arrival, for instance. This may also enable more efficient training because only the encoder 702 is trained as opposed to also training the decoder 704. Additionally, the physical propagation channel model-based decoder 704 allows for interpretability because the decoder 704 can map portions of the latent representation $z_t$ to aspects of the physical propagation channel. For example, the first element of the latent representation $z_t$ may be defined to correspond to an angle of arrival. Moreover, the example architecture 700 may allow for dynamical modeling (e.g., Kalman filtering, ray tracing) based on the physical propagation channel model. Because the latent representation $z_t$ is interpretable, predictability may be improved.

In some aspects, the known physical model is not fully known. That is, some parameters values of the model may be unknown, such as the receiver (Rx) array response. In these aspects, the network may estimate the unknown features. This approach may be referred to as a hybrid approach.

In some aspects, the physical propagation channel model may be represented as a summation of multipath components (MPCs). Each multipath component may have a delay and a complex magnitude, for example. In addition, each multipath component may have an associated transmitter (Tx) array response and a receiver (Rx) array response. In some aspects, the Tx array response and the Rx array response may be represented as a learnable function (e.g., as neural network layers) of angular responses. Furthermore, the physical propagation channel model may also include impulse responses of Tx and Rx chains. In some examples, the physical propagation channel model may be given by:

$$H[k] = H_{RX}[k]H_{OTA}[k]H_{TX}[k] \tag{3}$$

$$H_{OTA}[k] = \sum_{n=0}^{N-1}\alpha_n a_{RX}(\psi_{RX})a_{TX}^{H}(\psi_{TX})\exp(-j2\pi\tau_n k) \tag{4}$$

where H[k] is the total impulse response and $H_{OTA}[k]$ is the impulse response of the propagation channel. Additionally, $a_n$ is a scaled complex magnitude of the n'th multipath component, $\tau_n$ is a scaled delay of the n'th MPC, $\psi_{RX}$, $\psi_{TX}$—Rx and Tx angles (azimuth, zenith) of the n'th MPC, and the parameters $a_{RX}(\cdot)$, $a_{TX}(\cdot)$ are the Rx and Tx array response, respectively, represented by trainable neural network (NN) layers. Furthermore, for each subcarrier, the parameter $H_{RX}[k] = \text{diag}\{h_{RX,m}[k]\}$-receiver chain frequency response for the m'th Rx antenna and $H_{TX}[k] = \text{diag}\{h_{TX,m}[k]\}$—transmitter chain frequency response for n'th Tx antenna, where $z = \{(a_n, \tau_n, \psi_{RX}, \psi_{TX})|0 \le n \le N\}$.

In some aspects, the example architecture 700 may be trained via unsupervised learning based on measurement channel data. Once trained, the encoder of the NN may be used to extract latent features from the given channel. The decoder of the NN may generate new channel samples and/or channel sample sequences from latent channel features. The trained encoder/decoder neural network pair may also be configured and trained for channel state feedback between the UE and base station (e.g., a gNodeB (gNB)).

In some aspects, the example architecture 700 may perform bandwidth stitching. For instance, given two frequency bands separated by a guard band, an unknown channel at the guard band may be inferred such that a continuous channel response may be constructed.

In some aspects, a transmitting device (e.g., base station 110) jointly trains an encoder and decoder pair such that the cascade of the encoder and the decoder reconstructs the original channel sequence given as input to the encoder. However, only the encoder is used and the decoder may be discarded. That is, the transmitting device may train the decoder only for the purpose of training the encoder and not for use in reconstructing an encoder input. Instead, a receiving device may independently train a (different) decoder (for example, decoder 704 that may use a physical propagation channel model) which may be different from the decoder that the transmitting device has internally. In this way, the transmitting device (e.g., base station 110) may obscure and in some aspects avoid revealing its encoder design to the receiving device (e.g., UE 120). Similarly, the receiving device (e.g., UE 120) may obscure, and in some aspects, avoid disclosing its decoder design to the transmitting device (e.g., base station 110). Moreover, in some aspects, neither the transmitting device (e.g., base station 110) nor the receiving device (e.g., UE 120) imposes the use of a particular encoder or decoder to the other device.

Accordingly, aspects of the present disclosure provide for a more efficient and interpretable learning compared to the conventional, non-physical propagation channel-based approaches. Furthermore, the improved interpretability enables a less complex specification of neural network pairs across a gNB and a UE. Because the latent representation has interpretable meaning, the encoder (e.g., 702) may be left as a standalone implementation. This is contrary to conventional auto-encoder-based neural network that uses joint training and specification of the compatible encoder and decoder pair.

Figure 8:
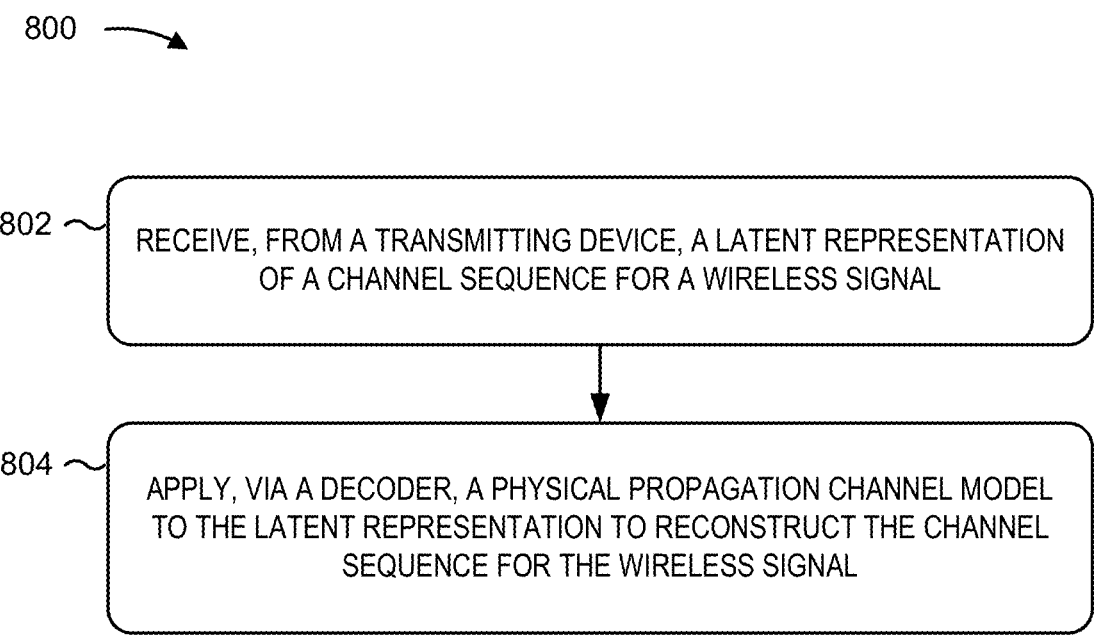
FIG. 8 is a flow diagram illustrating an example process performed, for example, by a receiving device, in accordance with various aspects of the present disclosure.

FIG. 8 is a flow diagram illustrating an example process 800 performed, for example, by a processor, in accordance with various aspects of the present disclosure. At block 802, the process 800 receives, from a transmitting device, a latent representation of channel features for a wireless signal. The transmitting device may use an encoder (e.g., the encoder 702 of FIG. 7) to transform a channel sequence to a latent representation. The latent representation may, for example, include one or more of a set of delays, complex magnitudes, angles of departure, and angles of arrival. In some aspects, the latent representation may be sent to the receiving device as a channel state feedback.

At block 804, the process 800 applies, via a decoder, a physical propagation channel model to the latent representation to reconstruct the channel features for the wireless signal. The receiving device may use the decoder (e.g., the decoder 704 of FIG. 7) to reconstruct the channel features from the latent representation.

In some aspects, the physical propagation channel model may include a sum of multipath components. Each of the multipath components may include a delay and a complex magnitude, for instance. In other examples, each multipath component may include a transmitter (Tx) array response and a receiver (Rx) array response. Furthermore, the Tx array response and the Rx array response may be represented as learnable functions of azimuth and zenith angles of departure and azimuth and zenith angles of arrival, respectively.

In some aspects, additional effects on the wireless signal not captured by the physical channel model may be captured via additional learnable neural network layers. For example, the additional effects may include a receiver (Rx) chain impulse response and a transmitter (Tx) chain impulse response.

In some aspects, the encoder may be a first neural network (e.g., the encoder 702 of FIG. 7) and the decoder is a second neural network based on the physical propagation channel model (e.g., the decoder 704 of FIG. 7). The decoder and the encoder may be trained jointly or independently.

FIG. 9 is a flow diagram illustrating an example process 900 performed, for example, by a processor, in accordance with various aspects of the present disclosure. At block 902, the process 900 receives an input comprising channel features for a wireless signal. As shown in FIG. 7, encoder 702 receives a channel sequence (high dimensional representation) H_r in a first layer as an input.

At block 904, the process 900 process, via an encoder, the channel features to produce a latent representation of the channel features for the wireless signal, the latent representation including at least one elements that maps to a parameter of a physical propagation channel. The transmitting device may use an encoder (e.g., the encoder 702 of FIG. 7) to transform channel features to a latent representation. The latent representation may, for example, include one or more of a set of delays, complex magnitudes, angles of departure, and angles of arrival. In some aspects, the latent representation may be sent to the receiving device as a channel state feedback.

At block 904, the process 900, transmits the latent representation to a receiving device. As shown, in FIG. 7, the encoder 702 sends a latent representation of the channel features to a decoder 704.

Implementation examples are provided in the following numbered clauses:

1. A method for wireless communication by a receiving device, comprising:
   receiving, from a transmitting device, a latent representation of a channel sequence for a wireless signal; and
   applying, via a decoder, a physical propagation channel model to the latent representation to reconstruct the channel sequence for the wireless signal.
2. The method of clause 1, in which the physical propagation channel model comprises a sum of multipath components.
3. The method of clause 1 or 2, in which each of the multipath components has a delay and a complex magnitude.
4. The method of any of clauses 1-3, in which each of the multipath components has a transmitter (Tx) array response and a receiver (Rx) array response.
5. The method of any of clauses 1-4, in which the Tx array response and the Rx array response are represented as learnable functions of azimuth and zenith angles of departure and azimuth and zenith angles of arrival, respectively.
6. The method of any of clauses 1-5, further comprising capturing additional effects on the wireless signal not captured by the physical propagation channel model via additional learnable neural network layers.
7. The method of any of clauses 1-6, in which the additional effects includes a receiver (Rx) chain impulse response and a transmitter (Tx) chain impulse response.
8. The method of any of clauses 1-7, in which the latent representation is sent to the receiving device as channel state feedback.
9. The method of any of clauses 1-8, in which the reconstructed channel sequence comprises a continuous channel response across a plurality of frequency bands separated by a guard band.
10. The method of any of clauses 1-9, in which the latent representation comprises one or more of a set of delays, complex magnitudes, angles of departure, and angles of arrival.
11. The method of any of clauses 1-10, in which the latent representation comprises an encoded channel sequence, and the receiving device uses the decoder to reconstruct the channel sequence from the latent representation.
12. The method of any of clauses 1-11, in which the decoder is a neural network based on the physical propagation channel model.
13. The method of any of clauses 1-12, further comprising training the decoder at the receiving device independently of an encoder at the transmitting device.
14. A method for wireless communication by a transmitting device, comprising:
    receiving, via an encoder, an input comprising a channel sequence for a wireless signal;
    processing, via the encoder, the channel sequence to produce a latent representation of the channel sequence for the wireless signal, the latent representation including at least one elements that maps to a parameter of a physical propagation channel model; and transmitting the latent representation to a receiving device.

15. The method of clause 14, in which the physical propagation channel model comprises a sum of multipath components.

16. The method of clause 14 or 15, in which each of the multipath components has a delay and a complex magnitude.

17. The method of any of clauses 14-16, in which each of the multipath components has a transmitter (Tx) array response and a receiver (Rx) array response.

18. The method of any of clauses 14-17, in which the Tx array response and the Rx array response are represented as learnable functions of azimuth and zenith angles of departure and azimuth and zenith angles of arrival, respectively.

19. The method of any of clauses 14-18, in which the latent representation is transmitted to the receiving device as channel state feedback.

20. The method of any of clauses 14-19, in which the encoder comprises a neural network.

21. The method of any of clauses 14-20, in which the transmitting device jointly trains an encoder-decoder pair such that a cascade of the encoder and a second decoder of the encoder-decoder pair reconstructs the channel sequence input at the encoder.

22. An apparatus for wireless communication by a receiving device, comprising:

a memory; and at least one processor coupled to the memory, the at least one processor being configured:

to receive, from a transmitting device, a latent representation of a channel sequence for a wireless signal; and to apply, via a decoder, a physical propagation channel model to the latent representation to reconstruct the channel sequence for the wireless signal.

23. The apparatus of clause 22, in which the physical propagation channel model comprises a sum of multipath components.

24. The apparatus of clause 22 or 23, in which each of the multipath components has a delay and a complex magnitude.

25. The apparatus of any of clauses 22-24, in which each of the multipath components has a transmitter (Tx) array response and a receiver (Rx) array response.

26. The apparatus of any of clauses 22-25, in which the at least one processor is further configured to represent the Tx array response and the Rx array response as learnable functions of azimuth and zenith angles of departure and azimuth and zenith angles of arrival, respectively.

27. The apparatus of any of clauses 22-26, in which the at least one processor is further configured to capture additional effects on the wireless signal not captured by the physical propagation channel model via additional learnable neural network layers.

28. The apparatus of any of clauses 22-27, in which the additional effects includes a receiver (Rx) chain impulse response and a transmitter (Tx) chain impulse response.

29. The apparatus of any of clauses 22-28, in which the at least one processor is further configured to receive, via the receiving device, the latent representation as channel state feedback.

30. The apparatus of any of clauses 22-29, in which the reconstructed channel sequence comprises a continuous channel response across a plurality of frequency bands separated by a guard band.

31. The apparatus of any of clauses 22-30, in which the latent representation comprises one or more of a set of delays, complex magnitudes, angles of departure, and angles of arrival.

32. The apparatus of any of clauses 22-31, in which the latent representation comprises an encoded channel sequence, and the receiving device uses the decoder to reconstruct the channel sequence from the latent representation.

33. The apparatus of any of clauses 22-32, in which the decoder is a neural network based on the physical propagation channel model.

34. The apparatus of any of clauses 22-33, in which the at least one processor is further configured to train the decoder at the receiving device independently of an encoder at the transmitting device.

35. A apparatus for wireless communication by a transmitting device, comprising:

a memory; and at least one processor coupled to the memory, the at least one processor being configured:

to receive, via an encoder, an input comprising a channel sequence for a wireless signal;

to process, via the encoder, the channel sequence to produce a latent representation of the channel sequence for the wireless signal, the latent representation including at least one elements that maps to a parameter of a physical propagation channel model; and to transmit, the latent representation to a receiving device.

36. The apparatus of clause 35, in which the physical propagation channel model comprises a sum of multipath components.

37. The apparatus of clause 35 or 36, in which each of the multipath components has a delay and a complex magnitude.

38. The apparatus of any of clauses 35-37, in which each of the multipath components has a transmitter (Tx) array response and a receiver (Rx) array response.

39. The apparatus of any of clauses 35-38, in which the at least one processor is further configured to represent the Tx array response and the Rx array response as learnable functions of azimuth and zenith angles of departure and azimuth and zenith angles of arrival, respectively.

40. The apparatus of any of clauses 35-39, in which the at least one processor is further configured to transmit the latent representation to the receiving device as channel state feedback.

41. The apparatus of any of clauses 35-40, in which the encoder comprises a neural network.

42. The apparatus of any of clauses 35-41, in which the at least one processor is further configured to jointly train, via the transmitting device, an encoder-decoder pair such that a cascade of the encoder and a second decoder of the encoder-decoder pair reconstructs the channel sequence input at the encoder.

43. An apparatus for wireless communication by a receiving device, comprising:

means for receiving, from a transmitting device, a latent representation of a channel sequence for a wireless signal; and means for applying, via a decoder, a physical propagation channel model to the latent representation to reconstruct the channel sequence for the wireless signal.

44. A method for wireless communication by a transmitting device, comprising:

means for receiving an input comprising a channel sequence for a wireless signal;

mean for processing, via an encoder, the channel sequence to produce a latent representation of the channel sequence for the wireless signal, the latent representation including at least one elements that maps to a parameter of a physical propagation channel; and means for transmitting the latent representation to a receiving device.

45. A non-transitory computer readable medium having encoded thereon program code for wireless communication by a receiving device, the program code being executed by a processor and comprising:

program code to receive, from a transmitting device, a latent representation of a channel sequence for a wireless signal; and program code to apply, via a decoder, a physical propagation channel model to the latent representation to reconstruct the channel sequence for the wireless signal.

46. A non-transitory computer readable medium having encoded thereon program code for wireless communication by a transmitting device, the program code being executed by a processor and comprising:

program code to receive an input comprising a channel sequence for a wireless signal;

program code to process, via an encoder, the channel sequence to produce a latent representation of the channel sequence for the wireless signal, the latent representation including at least one elements that maps to a parameter of a physical propagation channel; and program code to transmit, the latent representation to a receiving device.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a–b, a–c, b–c, and a–b–c, as well as any combination with multiples of the same element (e.g., a–a, a–a–a, a–a–b, a–a–c, a–b–b, a–c–c, b–b, b–b–b, b–b–c, c–c, and c–c–c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication by a receiving device, comprising:

receiving, from a transmitting device, a latent representation $z_t$ of a channel sequence $H_t$ for communicating a wireless signal; and applying, via a decoder, both a physical propagation channel model and a neural network to the latent representation to generate a reconstructed channel sequence $\hat{H}_t$ for the wireless signal, wherein the physical propagation channel model is represented by a sum of multipath components, the latent representation comprises a vector having portions controlled by an encoder to follow physical parameters of the physical propagation channel model such that the decoder maps at least one-portion of the vector for the latent representation to a physical parameter of the physical propagation channel model based on a position within the vector of the at least one portion of the vector for the latent representation, the neural network estimates unknown parameters of the physical propagation channel model, and the decoder is trained independently of the encoder.

2. The method of claim 1, in which each of the multipath components has a delay and a complex magnitude.

3. The method of claim 1, in which each of the multipath components has a transmitter (Tx) array response and a receiver (Rx) array response.

4. The method of claim 3, in which the Tx array response and the Rx array response are represented as learnable functions of azimuth and zenith angles of departure and azimuth and zenith angles of arrival, respectively.

5. The method of claim 1, further comprising capturing additional effects on the wireless signal not captured by the physical propagation channel model via additional learnable neural network layers.

6. The method of claim 5, in which the additional effects includes a receiver (Rx) chain impulse response and a transmitter (Tx) chain impulse response.

7. The method of claim 1, in which the latent representation is sent to the receiving device as channel state feedback.

8. The method of claim 1, in which the reconstructed channel sequence comprises a continuous channel response across a plurality of frequency bands separated by a guard band.

9. The method of claim 1, in which the latent representation comprises one or more of a set of delays, complex magnitudes, angles of departure, and angles of arrival.

10. The method of claim 1, in which the latent representation comprises an encoded channel sequence, and the receiving device uses the decoder to generate the reconstructed channel sequence from the latent representation.

11. A method for wireless communication by a transmitting device, comprising:

receiving, via an encoder, an input comprising a channel sequence for a wireless signal;

processing, via the encoder, the channel sequence to produce a latent representation of the channel sequence for the wireless signal, the latent representation comprising a vector controlled by the encoder to follow physical parameters of a physical propagation channel model such that at least one portion of the vector of the latent representation maps to a physical parameter of the physical propagation channel model based on a position within the vector of the at least one portion of the vector of the latent representation, the physical propagation channel model being represented by a sum of multipath components, and the encoder being trained independently of the physical propagation channel model; and transmitting the latent representation to the receiving device.

12. The method of claim 11, in which each of the multipath components has a delay and a complex magnitude.

13. The method of claim 12, in which each of the multipath components has a transmitter (Tx) array response and a receiver (Rx) array response.

14. The method of claim 13, in which the Tx array response and the Rx array response are represented as learnable functions of azimuth and zenith angles of departure and azimuth and zenith angles of arrival, respectively.

15. The method of claim 11, in which the latent representation is transmitted to the receiving device as channel state feedback.

16. The method of claim 11, in which the encoder comprises a neural network.

17. The method of claim 11, in which the transmitting device jointly trains an encoder-decoder pair such that a cascade of the encoder and a second decoder of the encoder-decoder pair reconstructs the channel sequence input at the encoder.

18. An apparatus for wireless communication by a receiving device, comprising:

at least one memory; and at least one processor coupled to the at least one memory, the at least one processor being configured:

to receive, from a transmitting device, a latent representation $z_t$ of a channel sequence $H_t$ for communicating a wireless signal; and to apply, via a decoder, both a physical propagation channel model and a neural network to the latent representation to generate a reconstructed channel sequence $H_t$ for the wireless signal, wherein the physical propagation channel model is represented by a sum of multipath components, the latent representation comprises a vector having portions controlled by an encoder to follow physical parameters of the physical propagation channel model such that the decoder maps at least one portion of the vector for the latent representation to a physical parameter of the physical propagation channel model based on a position within the vector of the at least one portion of the vector for the latent representation, the neural network estimates unknown parameters of the physical propagation channel model, and the decoder is trained independently of the encoder.

19. The apparatus of claim 18, in which each of the multipath components has a delay and a complex magnitude.

20. The apparatus of claim 18, in which each of the multipath components has a transmitter (Tx) array response and a receiver (Rx) array response.

21. The apparatus of claim 20, in which the at least one processor is further configured to represent the Tx array response and the Rx array response as learnable functions of azimuth and zenith angles of departure and azimuth and zenith angles of arrival, respectively.

22. The apparatus of claim 18, in which the at least one processor is further configured to capture additional effects on the wireless signal not captured by the physical propagation channel model via additional learnable neural network layers.

23. The apparatus of claim 22, in which the additional effects includes a receiver (Rx) chain impulse response and a transmitter (Tx) chain impulse response.

24. The apparatus of claim 18, in which the at least one processor is further configured to receive, via the receiving device, the latent representation as channel state feedback.

25. The apparatus of claim 18, in which the reconstructed channel sequence comprises a continuous channel response across a plurality of frequency bands separated by a guard band.

26. The apparatus of claim 18, in which the latent representation comprises one or more of a set of delays, complex magnitudes, angles of departure, and angles of arrival.

27. The apparatus of claim 18, in which the latent representation comprises an encoded channel sequence, and the receiving device uses the decoder to generate the reconstructed channel sequence from the latent representation.

28. A apparatus for wireless communication by a transmitting device, comprising:

at least one memory; and at least one processor coupled to the at least one memory, the at least one processor being configured:

to receive, via an encoder, an input comprising a channel sequence for a wireless signal;

to process, via the encoder, the channel sequence to produce a latent representation of the channel sequence for the wireless signal, the latent representation comprising a vector controlled by the encoder to follow physical parameters of a physical propagation channel model such that at least one portion of the vector of the latent representation maps to a physical parameter of the physical propagation chan-
nel model based on a position within the vector of the
at least one portion of the vector of the latent
representation, the physical propagation channel
model being represented by a sum of multipath
components, and the encoder being trained indepen-
dently of the physical propagation channel model;
and
to transmit, the latent representation to the receiving
device.

29. The apparatus of claim 28, in which each of the
multipath components has a delay and a complex magni-
tude.

30. The apparatus of claim 29, in which each of the
multipath components has a transmitter (Tx) array response
and a receiver (Rx) array response.

31. The apparatus of claim 30, in which the at least one
processor is further configured to represent the Tx array
response and the Rx array response as learnable functions of
azimuth and zenith angles of departure and azimuth and
zenith angles of arrival, respectively.

32. The apparatus of claim 28, in which the at least one
processor is further configured to transmit the latent repre-
sentation to the receiving device as channel state feedback.

33. The apparatus of claim 28, in which the encoder
comprises a neural network.

34. The apparatus of claim 28, in which the at least one
processor is further configured to jointly train, via the
transmitting device, an encoder-decoder pair such that a
cascade of the encoder and a second decoder of the encoder-
decoder pair reconstructs the channel sequence input at the
encoder.

35. An apparatus for wireless communication by a receiv-
ing device, comprising:
    means for receiving, from a transmitting device, a latent
    representation $z_t$ of a channel sequence $H_t$ for commu-
    nicating a wireless signal; and
    means for applying, via a decoder, both a physical propa-
    gation channel model and a neural network to the latent
    representation to generate a reconstructed channel
    sequence $\hat{H}_t$ for the wireless signal, wherein the physi-
    cal propagation channel model is represented by a sum
    of multipath components, the latent representation
    comprises a vector having portions controlled by an
    encoder to follow physical parameters of the physical
    propagation channel model such that the decoder maps
    at least one portion of the vector for the latent repre-
    sentation to a physical parameter of the physical propa-
    gation channel model based on a position within the
    vector of the at least one portion of the vector for the
    latent representation, the neural network estimates
    unknown parameters of the physical propagation chan-
    nel model, and the decoder is trained independently of
    the encoder.

36. A method for wireless communication by a transmit-
ting device, comprising:
    means for receiving an input comprising a channel
    sequence for a wireless signal;
    mean for processing, via an encoder, the channel sequence
    to produce a latent representation of the channel
    sequence for the wireless signal, the latent representation comprising a vector controlled by the encoder to
follow physical parameters of a physical propagation
channel model such that at least one portion of the
vector of the latent representation maps to a physical
parameter of the physical propagation channel model
based on a position within the vector of the at least one
portion of the vector of the latent representation, the
physical propagation channel model being represented
by a sum of multipath components, and the encoder
being trained independently of the physical propaga-
tion channel model; and
    means for transmitting the latent representation to the
    receiving device.

37. A non-transitory computer readable medium having
encoded thereon program code for wireless communication
by a receiving device, the program code being executed by
a processor and comprising:
    program code to receive, from a transmitting device, a
    latent representation $z_t$ of a channel sequence $H_t$ for
    communicating a wireless signal; and
    program code to apply, via a decoder, both a physical
    propagation channel model and a neural network to the
    latent representation to generate a reconstructed chan-
    nel sequence $\hat{H}_t$ for the wireless signal, wherein the
    physical propagation channel model is represented by a
    sum of multipath components, the latent representation
    comprises a vector having portions controlled by an
    encoder to follow physical parameters of the physical
    propagation channel model such that the decoder maps
    at least one portion of the vector for the latent repre-
    sentation to a physical parameter of the physical propa-
    gation channel model based on a position within the
    vector of the at least one portion of the vector for the
    latent representation, the neural network estimates
    unknown parameters of the physical propagation chan-
    nel model, and the decoder is trained independently of
    the encoder.

38. A non-transitory computer readable medium having
encoded thereon program code for wireless communication
by a transmitting device, the program code being executed
by a processor and comprising:
    program code to receive an input comprising a channel
    sequence for a wireless signal;
    program code to process, via an encoder, the channel
    sequence to produce a latent representation of the
    channel sequence for the wireless signal, the latent
    representation comprising a vector controlled by the
    encoder to follow physical parameters of a physical
    propagation channel model such that at least one por-
    tion of the vector of the latent representation maps to a
    physical parameter of the physical propagation channel
    model based on a position within the vector of the at
    least one portion of the vector of the latent represen-
    tation, the physical propagation channel model being
    represented by a sum of multipath components, and the
    encoder being trained independently of the physical
    propagation channel model; and
    program code to transmit, the latent representation to the
    receiving device.

* * * * *